United States Patent [19]

Parkin

[11] 4,019,684

[45] Apr. 26, 1977

[54] ATOMIZER

[75] Inventor: Charles Stephen Parkin, Potterspury, England

[73] Assignee: Ciba-Geigy Corporation, Ardsley, N.Y.

[22] Filed: Mar. 11, 1976

[21] Appl. No.: 666,119

Related U.S. Application Data

[63] Continuation of Ser. No. 561,443, March 24, 1975, abandoned.

[52] U.S. Cl. ............................... 239/145; 239/222; 239/222.11; 239/224

[51] Int. Cl.$^{2}$ ........................................ A01G 27/00

[58] Field of Search ............ 239/145, 171, 214.13, 239/214.15, 222, 222.11, 214, 77, 224; 138/42

[56] References Cited

UNITED STATES PATENTS

| | | | |
|---|---|---|---|
| 2,417,929 | 3/1947 | Hanson | 239/214 X |
| 3,398,893 | 8/1968 | Missimer et al. | 239/222 X |
| 3,452,931 | 7/1969 | Knowles | 239/171 X |
| 3,459,586 | 8/1969 | Kiwiet et al. | 239/222 X |
| 3,589,613 | 6/1971 | Saladin | 239/171 X |
| 3,691,764 | 9/1972 | Ware | 239/145 X |
| 3,711,259 | 1/1973 | Gurney | 138/42 X |
| 3,823,743 | 7/1974 | King | 138/42 |

*Primary Examiner*—John J. Love
*Attorney, Agent, or Firm*—Harry Falber

[57] ABSTRACT

A rotary atomizer comprising an axially apertured disc of reticulated metal foam, means for feeding liquid to be atomized to the surface of the aperture, and means for rotating the disc at such speeds that the liquid to be atomized travels radially through the disc and is atomized at the outer surface thereof.

11 Claims, 6 Drawing Figures

ATOMIZER

This is a continuation of application Ser. No. 561,443, filed on Mar. 24, 1975, now abandoned.

The present invention relates to a device for atomising liquids, and particularly to a rotating atomiser.

Rotary atomisers for uses such as aerial spraying have been known for some time. A common type of rotating atomiser is known as the rotating cage atomiser. In this device the liquid to be atomised is fed along the axis of a rotating cylindrical cage made of wire mesh, through a plurality of holes in a stationary cylinder located inside and co-axially of the rotating cylinder, and then by centrifugal force through the holes in the rotating cage.

Investigations into the mechanisms of atomization employed by the rotating cage atomizer have been carried out and the conclusion reached that a large proportion of the liquid impinging on the cage surface was shattered by the relative motion of the cage and liquid and that appreciable amounts of the liquid did not acquire the peripheral speed of the cage. This conclusion had also been drawn earlier as the result of field trials with a viscous insecticide.

Since this form of shattering results in a wide droplet spectrum attempts have been made to overcome this deficiency by packing the cage with foam. Foam does, however, compress under the large forces exerted by the rotation and has not been found to be practical. The use of fibreglass matting attached to the inside surface of the cage has also been tried. This caused some distortion to the cage, but some improvement was found, e.g. in the reduced width of the droplet spectrum.

An additional disadvantage of the rotating cage atomiser is that the droplets tend to be ejected in pulses, whereas it is desired to have the droplets ejected evenly, and more droplets tend to come from one side of the cage than the other. In some cases as much as 50% more liquid is ejected from one side than the other.

Experiments with spinning discs at low flow rates have also indicated that if the liquid is rotated at the peripheral speed of the device a reduction in the width of the droplet spectrum results. However, if a spinning disc is operated at flow rates practical for aerial application sheet formation or liquid maldistribution occurs. Attempts at using stacks of discs have not met with much success due to the difficulty of feeding several discs evenly and, in one particular case, maldistribution of liquid due to spacing bolts.

A recent development in rotary atomization is a porous sintered metal spray head. This consists of a cylinder of sintered metal which is rotated at high speed by an electric motor. The liquid is forced through the pores in the sintered metal by centrifugal force and breaks-up at the surface. Sintered metal does, however, suffer from a relatively high pressure drop and has a limited output. The close structure of the sintered metal also causes problems of blockage and it requires a fine filtration system.

An object of the present invention is to provide an improved rotating atomizer, suitable particularly for aerial application which rotates the liquid at the peripheral speed of the rotating head and provides low pressure drop, even liquid flow and greater mechanical efficiency.

Accordingly the present invention provides a rotary atomiser comprising an axially apertured disc of reticulated metal foam, means for feeding liquid to be atomised to the surface of said aperture, and means for rotating the disc at such speeds that liquid to be atomised travels radially through the disc and is atomised at the outer surface thereof.

Reticulated metal foam is produced by applying a metal coating on to a skeletal foam, such as polyurethane foam, after which the original foam is removed leaving an open skeletal structure. A wide range of metals can be used, but the most usual is nickel or a nickel-chrome alloy. The structure has high rigidity and is extremely porous as up to 97% of the material consists of voids.

A suitable material is that sold by Dunlop Ltd. under the Trade Mark Retimet. This is available in different grades characterised by the number of pores per inch. The grades available are from 80 to 20.

The means of feeding liquid to the surface of the aperture can be a stationary feed tube and rotating perforated cylinder as in the rotating cage atomiser, but it is preferred to feed the liquid evenly over 360° of the surface of the aperture. This may be achieved by replacing the perforations of the rotating cylinder by a slot.

A more preferred arrangement comprises a stationary piece of reticulated metal foam positioned between the liquid feed and the slot. This arrangement provides a more even distribution and constant feed to the surface and prevents any surging from occurring.

An alternative method of feeding liquid to the surface of the aperture comprises feeding the liquid by means of jet or the like on to the surface of a metal disc provided as a backing plate, the liquid travelling radially outwardly by centrifugal force. Better control of liquid flow in this arrangement can be had by placing a circular weir around the point of impingement of liquid on the backing plate to produce a small reservoir of liquid which continuously overflows, feeding liquid to the metal foam.

The means for rotating the disc can vary depending on the intended use of the atomiser, and may be linked directly or indirectly via a suitable mechanical means, e.g. a belt drive. When used for aerial spraying it may be preferred to use a windmill drive or a hydraulic motor. When used on the ground, e.g. on a tractor the rotation can be caused by an electric motor, hydraulic motor or other suitable drive means.

The invention will be illustrated, by way of Example, with reference to the drawings accompanying the Provisional Specification, in which.

Figure 1:
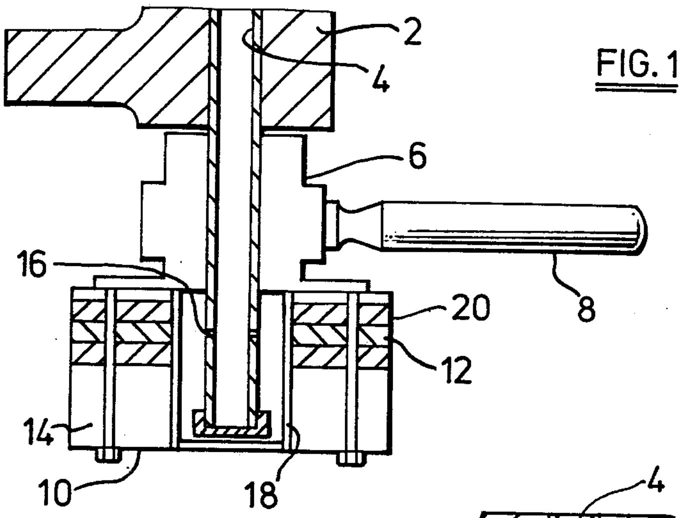
FIG. 1 is a cross-section of an atomiser according to the invention.

It should be understood that where a particular drive means is shown in the drawings, the atomiser concerned is not limited to use with that drive means, but can be used with different drive means according to the intended use of the atomiser.

Referring to FIG. 1, Mounting Block 2, for mounting the atomiser on an aircraft, has a feed 4 for liquid to be atomised to be fed to the atomiser. Also surrounding liquid feed 4 is windmill drive unit 6 having blades 8 (only one shown) and having affixed thereto rotating unit 10. Unit 10 comprises discs of Retimet 12 and spacer 14. In use, liquid is passed down liquid feed 4 and through holes 16. It then passes through holes in apertured cylinder 18 and then radially outwardly through discs 12 under centrifugal force caused by rotation of unit 10. The liquid is atomised at the outer surface 20 of discs 12.

The atomiser shown in FIG. 1 provides a unit which can be modified to take a number of metal foam discs with varying forms of feed. As can be seen from FIG. 1 the perforated cylinder used in a rotating cage atomiser is retained and provides a simple method of location for the discs. The feed tube is provided with a series of ⅛ inch diameter holes that can be selectively chosen for various positions of feed. Alternatively, if desired, the circular holes can be replaced by flat fan slots to give a wider more even dispersion.

Different grades of metal foam have been used in this investigation (30 and 45) and both 4 inch and 6 inch diameter discs of ½ to 1 inch thickness have been used. All discs had 2 inch diameter centre holes as a consequence of retaining the original perforated rotating cylinder of the rotating cage atomiser.

In trials using two 4 × ½ inch 45 grade discs it was shown that these are capable of atomizing up to 20 liters/min. with little drop in r.p.m. when used in a wind tunnel operated at 100 m.p.h. It is thus evident that small discs of metal foam can atomize large volumes of liquids. The small r.p.m. drop is due to the lightness of the metal foam compared with the rotating cage and the improved mechanical efficiency of the mechanism of atomisation.

The difference in weight is such that when three 4 × ½ inch 45 grade discs were operated with five 15 inch twisted blades set at 25° pitch a rotational speed in excess of 14,000 r.p.m. has been recorded. This resulted in a blade failure, but not disc failure. This indicates that the mechanical strength of the metal foam is undoubtedly superior to that of the wire mesh cage of the rotating cage atomiser where cage failures at around 10,000 r.p.m. have been noted.

Figure 2:
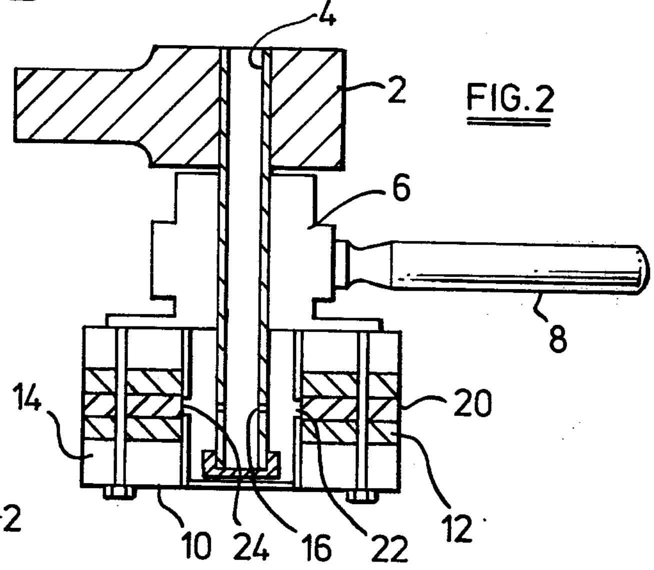
FIG. 2 is a cross-section of another atomiser according to the invention.

Referring now to FIG. 2, cylinder 18 in FIG. 1 is replaced by a cylinder having slot 22 through which the liquid passes into discs 12. Since the slot extends over the whole 360° of the inner surface 24 of discs 12 the liquid is fed evenly to discs 12 resulting in a more evenly produced atomisation at outer surface 20. It can be seen that slot 22 does not feed liquid to the whole of the inside surface 24 of discs 12 but only to a narrow band around the centre of surface 24. This is to ensure that no liquid reaches end plates 14, thus further providing for an even feed of liquid to surface 20 ensuring food atomisation.

Figure 3:
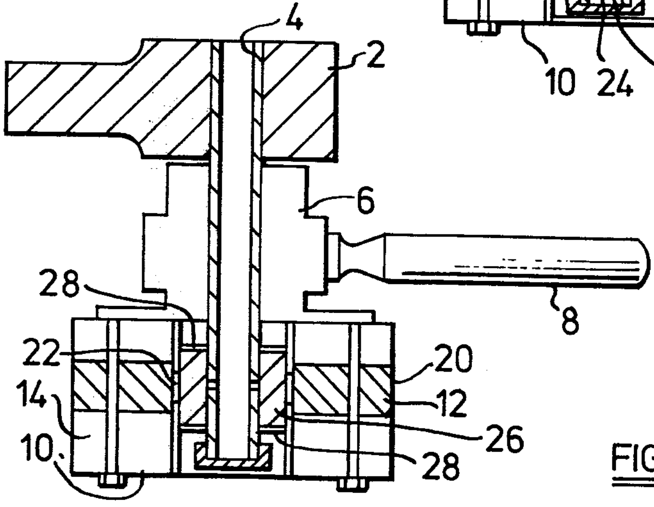
FIG. 3 is a cross-section of another atomiser according to the invention.

Referring now to FIG. 3, the three discs 12 of FIGS. 1 and 2 are replaced by a single disc 12. This is because of the difficulty in obtaining a sufficiently close fit of the discs to prevent liquid travelling in the small gaps between the discs. In addition a stationary piece of metal foam 26, provided with end plates 28 is inserted between feed 4 and slot 22. This helps to provide an even feed of liquid to slot 22.

Using the atomiser shown in FIG. 3, we have found that one 6 × 1 inch 30 grade disc is capable of atomising up to 35 liters/min. using a ½ inch feed slot.

Figure 4:
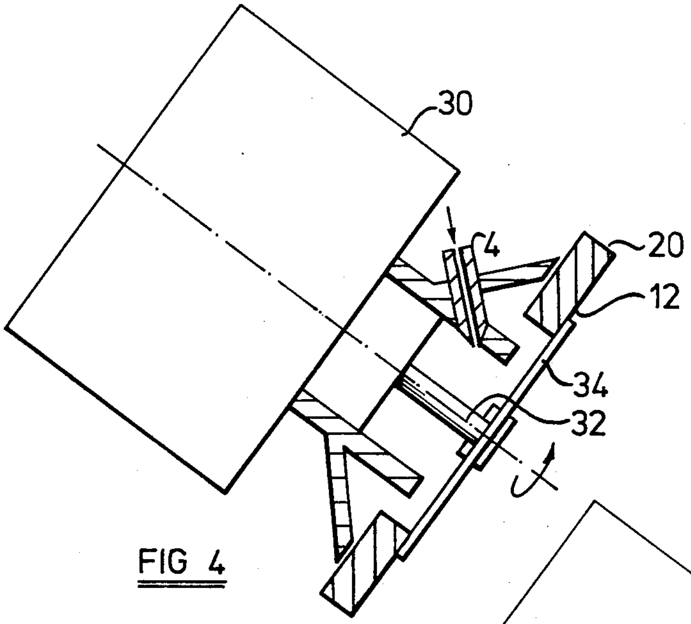
FIG. 4 is a partial cross-sectional view of another atomiser according to the invention.

Referring now to FIG. 4, disc 12 is affixed to plate 34 which is rotated by shaft 32 of electric motor 30. Liquid is fed in through feed 4 on to plate 34 and is forced radially through disc 12 by centrifugal force, and is atomised on surface 20.

The atomizer of FIG. 4 has been used with various simulated pesticide formulations, namely an ultra low volume formulation, a flowable formulation and a wettable powder formulation. Flowable formulations are stable suspension and wettable powders are suspensions. The simulated ultra low volume formulation was triethylene glycol monoethyl ether having a specific gravity of 1.05 and a viscosity of 9.5 cp. at 18° C. measured by an Ostwald viscometer. The simulated flowable was diluted to 20% by volume with water. The simulated wettable powder was suspended in water at 2% concentration w/v which is the maximum approved concentration. In all cases satisfactory atomisation was achieved at speeds of from 2,000 r.p.m. to 9,000 r.p.m. Blocking did not occur when the wettable powder was used, although the metal foam was coated to some extent. This coating did not impair the atomisation performance and could be washed off easily.

These tests have shown that an atomiser of this type, when using a windmill drive, is capable of atomising up to 42 liters per minute of liquid at 7,000 r.p.m., up to 25 liters per minute at 3,500 r.p.m., and up to 16 liters per minute at 1,560 r.p.m.

Figure 5:
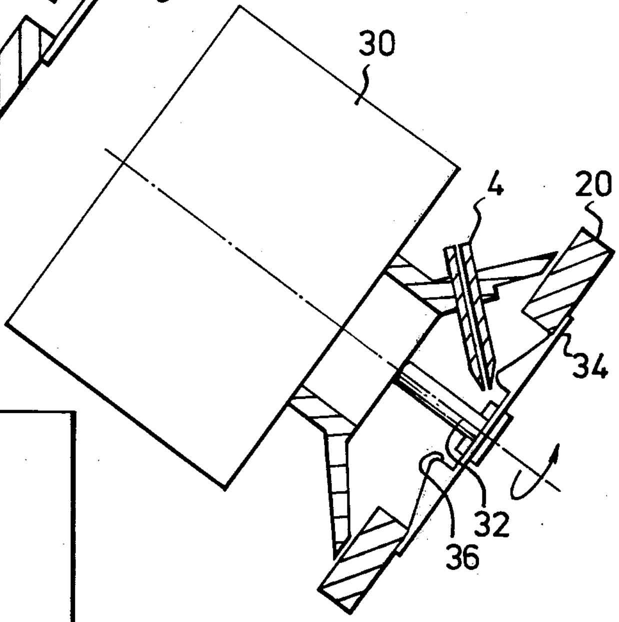
FIG. 5 is a modified version of the atomiser of FIG. 4.

Referring now to FIG. 5, weir 36 is provided on backing plate 34 of FIG. 4 to give greater control to the flow of liquid to metal foam 20.

Figure 6:
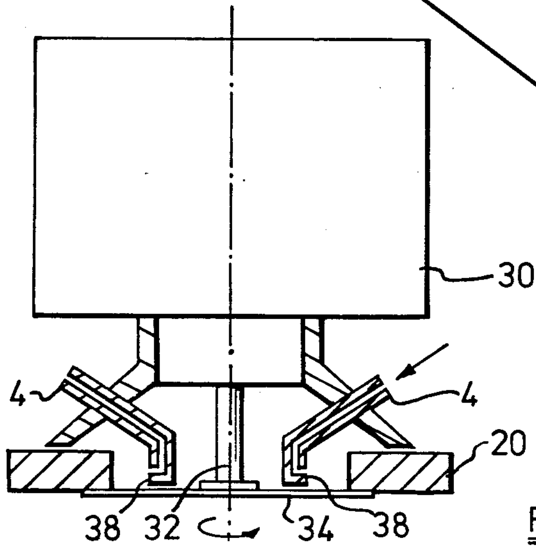
FIG. 6 is a partial cross-sectional view of another atomiser according to the invention.

The atomiser of FIG. 6 is again similar to that of FIG. 4, except that liquid feed nozzles 4 are provided with flat fan nozzles 38 directed at metal foam 20 rather than at backing plate 34. The flat fan, or similar, nozzles provide a wider and more even dispersion over the inner surface of metal foam 20 than a multiple hole arrangement, such as that shown in FIG. 1.

It can be seen that the atomiser according to the invention offers several advantages over known rotary atomisers. It is capable of a greater throughput of liquid for any given size and provides a narrower droplet size spectrum. Because of its lower weight and greater mechanical efficiency it requires less power to drive it at a given speed, or for the same power can be rotated faster. There is also a low pressure drop across the device.

It is also simple to change the discs of metal foam for discs of a different grade. For example, if the device is to be used for spraying a herbicide, it is necessary to produce larger droplets and thus metal foam of a different grade mzy be used.

The atomiser of the invention is suitable for various uses. When fitted with a windmill drive it is suitable for aerial spraying. When fitted with a hydraulic motor it may be used on aircraft, helicopters or tractors. When fitted with an electric motor or other drive means, it can be used for ground spraying, e.g. by mounting the device on a tractor or even for spraying by hand. The device can also be used for industrial applications such as in spray drying or in other fields where an atomised liquid is required.

These include, for example, the formation of granulated metals or polymers, such as in the production of lead shot by spraying molten lead. Another application is in the atomisation of fuel in, for example, boilers or incinerators.

What we claim is:

1. A rotary atomiser comprising an axially apertured disc of reticulated metal foam, means for feeding liquid to be atomised to the surface of the aperture, and means for rotating the disc at such speeds that the liquid to be atomised travels radially through the disc and is atomised at the outer surface thereof.

2. An atomiser as claimed in claim 1 in which the reticulated metal foam is nickel or a nickel-chrome alloy.

3. An atomiser as claimed in claim 1 in which the means for feeding liquid to said axially apertured disc of reticulated metal foam comprises a stationary feed tube and a rotating perforated cylinder.

4. An atomiser as claimed in claim 1 in which the means for feeding liquid to said axially apertured disc of reticulated metal foam comprises a stationary feed tube and a rotating cylinder having a slot therein.

5. An atomiser as claimed in claim 4, in which a stationary piece of reticulated metal foam is positioned between the liquid feed and the slot.

6. An atomiser as claimed in claim 1 in which the means for feeding liquid comprises a jet for directing the liquid on to the surface of a backing plate.

7. An atomiser as claimed in claim 6, in which a circular weir is placed around the point at which the liquid impinges on the backing plate.

8. An atomiser as claimed in claim 1, in which the means for feeding liquid comprises jets directed at the surface of the aperture.

9. An atomiser as claimed in claim 1, in which the means for rotating the disc comprises a windmill drive.

10. An atomiser as claimed in claim 1, in which the means for rotating the disc comprises an electric motor.

11. An atomiser as claimed in claim 1, in which the means for rotating the disc comprises a hydraulic motor.

* * * * *

UNITED STATES PATENT AND TRADEMARK OFFICE

CERTIFICATE OF CORRECTION

PATENT NO. : 4019684

DATED : April 26, 1977

INVENTOR(S) : Charles Stephen Parkin

It is certified that error appears in the above-identified patent and that said Letters Patent are hereby corrected as shown below:

The following should be inserted in the heading:

Foreign Application Priority Data

13511/74 Great Britain March 27, 1974

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*